United States Patent [19]

Sakakibara et al.

[11] Patent Number: 5,112,903
[45] Date of Patent: May 12, 1992

[54] ARTICLES MOLDED FROM MOISTURE SHRINKABLE RESINS

[75] Inventors: Megumu Sakakibara; Keiji Tanaka; Youji Fujiura, all of Kyoto, Japan

[73] Assignee: Sanyo Chemical Industries, Ltd., Kyoto, Japan

[21] Appl. No.: 546,889

[22] Filed: Jul. 2, 1990

[30] Foreign Application Priority Data

| Jul. 4, 1989 | [JP] | Japan | 1-173252 |
| Jul. 4, 1989 | [JP] | Japan | 1-173253 |
| Jul. 5, 1989 | [JP] | Japan | 1-173707 |
| Dec. 6, 1989 | [JP] | Japan | 1-316911 |

[51] Int. Cl.$^5$ ............ C08G 63/48; C08G 63/91; C08F 8/00; C08L 51/00

[52] U.S. Cl. .............. 525/54.2; 525/54.21; 525/54.23; 525/54.24; 525/54.26; 525/54.3; 525/54.31; 525/59; 525/63; 525/64; 525/65; 525/69; 525/71; 525/78; 525/79; 525/80; 525/83; 525/88; 525/89; 525/90; 525/92; 525/93; 525/94

[58] Field of Search ............ 527/313; 525/54.2, 54.21, 525/54.23, 54.24, 54.26, 54.3, 54.31, 54.4, 63, 64, 65, 69, 70, 71, 78, 79, 80, 83, 88, 89, 90, 92, 93, 94, 59

[56] References Cited

U.S. PATENT DOCUMENTS

| 3,429,794 | 2/1969 | Patterson | 522/166 |
| 3,867,324 | 2/1975 | Clendinning et al. | 524/381 |
| 3,879,493 | 4/1975 | Mudde | 525/77 |
| 3,931,068 | 1/1976 | Clendinning et al. | 524/17 |
| 4,642,267 | 2/1987 | Creasy et al. | 524/507 |
| 4,771,089 | 9/1988 | Ofstead | 524/41 |
| 4,839,450 | 6/1989 | Fanta et al. | 527/313 |
| 4,847,324 | 7/1989 | Creasy | 525/57 |

FOREIGN PATENT DOCUMENTS

| 57-160615 | 10/1982 | Japan . |
| 60-2709 | 1/1985 | Japan . |
| 1-298207 | 12/1989 | Japan . |
| 551834 | 3/1946 | United Kingdom . |
| 1566552 | 5/1980 | United Kingdom . |

Primary Examiner—Nathan M. Nutter
Attorney, Agent, or Firm—Birch, Stewart, Kolasch & Birch

[57] ABSTRACT

Articles molded from a moisture shrinkable polymer are provided. The article are stretched. The moisture shrinkable polymer may comprise a graft copolymer, a block copolymer, or a blend of a thermoplastic polymer with a hydrophilic synthetic polymer or a polysaccharide. The article absorb moisture and shrink at room temperature of not more than 50° C. in a highly humid atmosphere. The articles experience little decrease in tensile strength during shrinkage by moisture absorption or by prolonged storage after the moisture absorption. The article is useful when used as a film for shrink wrapping commodities which are not resistant to heat.

9 Claims, No Drawings

ARTICLES MOLDED FROM MOISTURE SHRINKABLE RESINS

BACKGROUND OF THE INVENTION

1. Field of the Invention

This invention relates to articles molded from moisture shrinkable resins. More particularly, this invention concerns a molded article which is in the form of a film.

2. Description of the Prior Arts

Among shrinkable molded articles, heat shrinkable synthetic resin films have found wide application for packing purposes.

Heat shrinkable synthetic films are molded from a resin comprising such polymers as poly(vinyl chloride), poly(vinylidene chloride), polyethylene, polypropylene, polybutadiene, polyamide. Heat shrinkable synthetic resin films are used for wrapping vegetables, fruits, meats, processed foods, for lump packing fine parts, notions, for seal packing electronic devices, aerozol products and for the like.

Heat shrinkable films, however, suffered from a drawback that they could not be used for packing articles whose qualities would be degraded at elevated temperatures, since the heat shrinkable films shrink by application of heat. Also, they required heating equipments for their shrinkage.

To obviate such disadvantages, U.S. Pat. No. 4,839,450, G. F. Fanta et al. disclose that starch-poly(methyl acrylate) graft copolymers prepared from hot water-soluble modified starches can be processed to produce moisture-shrinkable films. As formulations of the copolymer and a plasticizer are shaped into films, they are stretched to induce biaxial orientation of the shaped products. The resultant films are dimentionally stable at low moderate relative humidities, but they shrink when exposed to relative humidities approaching 100% at ambient temperature.

Since the moisture shrinkable film is molded from a resin containing α-starch as its structure, the film suffered from a drawback that, even though its tensile strength in the dry state before shrinkage was satisfactory, the film would undergo a significant drop in tensile strength during its shrinkage by moisture absorption. When such a film is used for wrapping articles and exposed to moisture, the film would rupture during its shrinkage due to its deteriorated tensile strength. The film shrunk by moisture absorption would also experience a further decrease in tensile strength at the position comprising the α-starch component parts through aging. Therefore, a package wrapped with such a moisture shrinkable film may gradually become ruptured after prolonged storage.

SUMMARY OF THE INVENTION

According to the present invention, there is provided a stretched molded article from a resin comprising a moisture shrinkable polymer selected from the group consisting of (A) a graft copolymer of a thermoplastic polymer and a hydrophilic synthetic polymer;
(B) a block copolymer of a thermoplastic polymer and a hydrophilic synthetic polymer;
(C) a blend of a thermoplastic polymer and a hydrophilic synthetic polymer;
(D) a graft copolymer of a thermoplastic polymer and a polysaccharide selected from the group consisting of a plant gum polysaccharide, a seaweed polysaccharide, a plant mucilage polysaccharide of heteroglycan, an animal polysaccharide, and a microbial polysaccharide;
(E) a block copolymer of a thermoplastic polymer and a polysaccharide selected from the group consisting of a plant gum polysaccharide, a seaweed polysaccharide, a plant mucilage polysaccharide of heteroglycan, an animal polysaccharide, and a microbial polysaccharide;
(F) a blend of a thermoplastic polymer and a polysaccharide selected from the group consisting of a plant gum polysaccharide, a seaweed polysaccharide, a plant mucilage polysaccharide of heteroglycan, an animal polysaccharide, and a microbial polysaccharide.

The thermoplastic polymers may preferably be those including an elastomer.

The hydrophilic synthetic polymer may preferably comprises a structural unit including hydroxyl and/or ether group therein.

The article of the present invention may be molded and stretched to form a film, a sheet, a fiber, a rod, and the like, which may be optionally foamed. Such a stretched and molded article of the moisture shrinkable polymer of the present invention may be prepared by stretched extrusion, blown-film extrusion, or calendering, or by stretching a cast film.

The present invention has obviated the disadvantage associated with the articles molded from the heat shrinkable resin that an application of heat was necessary for shrinking the article. The present invention has also overcome the drawback associated with the article molded from conventional moisture shrinkable polymers that the articles under moisture absorbed condition would suffer from tensile strength and susceptibility to aging.

OBJECT OF THE INVENTION

It is an object of the present invention to provide a stretched molded article from a moisture shrinkable resin comprising a moisture shrinkable polymer which is shrinkable by absorbing moisture, and which would not experience any decrease in its tensile strength either during the shrinkage by moisture absorption or during a prolonged storage after the shrinkage.

A further object of the present invention is to provide an article molded from a moisture shrinkable resin provided with the properties as described above, which is shrinkable by absorbing moisture in air at a ambient temperature of up to 50° C. and in an atmosphere having a relative humidity of 75% or higher without requiring any exposure to hot air or hot water.

A still further object of the present invention is to provide a moisture shrinkable stretched film having the properties as described above.

A still further object of the present invention is to provide a moisture shrinkable stretched film adapted for packing articles which are not resistant to heat, for example, foods such as vegetables, fruits, and meat; and components of precision machines and electronic equipment.

Other object and advantages of the invention will in part be obvious and will in part appear hereafter.

DETAILED DESCRIPTION OF THE INVENTION

According to a first aspect of the invention, there is provided a stretched molded article comprising a moisture shrinkable graft copolymer of a thermoplastic polymer and a hydrophilic synthetic polymer.

The thermoplastic polymers which may be used in the present invention include elastomers, for example, thermoplastic elastomers such as acrylate elastomers, ethylene acrylate elastomers, vinyl chloride elastomers, polyolefin elastomers, polystylene polybutadiene copolymeric thermoplastic elastomers, ethylene-vinyl acetate elastomers, chlorinated polyethylene elastomers, polyester elastomers, and polyamide elastomers; natural rubbers and their derivatives such as natural rubbers, ebonite, chlorinated rubber, rubber hydrochloride, and cyclized rubbers; diene rubbers such as butadiene rubbers, nitrile rubber, isoprene rubber, and chloroprene rubber; olefin rubbers such as isobutylene rubbers, isobutylene diene rubbers, ethylene propylene rubbers, and chlorosulfonated polyethylene; polysulfide rubbers; urethane rubbers such as polyester isocyanate polyadduct, and polyether isocyanate polyadduct; organosilicone rubbers such as silicone rubber; and fluororubbers; olefin polymers such as polyethylene, polypropylene, ethylene α-olefin copolymer, propylene α-olefin copolymer, poly-4-methylpentene, and polybutene; stylene polymers such as polystylene, AS polymer, ABS polymer, AAS polymer, AES polymer, ACS polymer, MBS polymer, stylene-butadiene copolymer, and HIPS; poly(methyl methacrylate), vinyl chloride polymers such as poly(vinyl chloride), vinyl chloride-vinyl acetate copolymer, vinyl chloride-acrylate copolymer, and vinyl chloride-methacrylate copolymer; poly(vinylidene chloride); poly(vinyl acetate); ethylene-vinyl acetate copolymer; ionomers; polyacetal; poly-amides such as nylon 6, nylon 66, nylon 610, nylon 11, nylon 12; polycarbonate; aromatic polyethers such as polyphenylene ether; polyethylene terephthalate; polybutylene terephthalate; polysulfone; polyethersulfone; polyimide; polyamide imide; and polyphenylene sulfide.

The thermoplastic polymers as mentioned above may be used either alone or in combination of two or more polymers. Among the foregoing polymers, preferred are thermoplastic polymers comprising elastomers having a glass transition temperature of up to 50° C. and more preferred are thermoplastic polymers comprising elastomers having a glass transition temperature of up to 35° C. such as acrylate elastomers.

The hydrophilic synthetic polymers which may be used in the present invention is selected from four groups of polymers; (1) polymers having a nonionic group; (2) polymers having an anionic group; (3) polymers having a cationic group; and (4) polymers having an amphoteric group. Those hydrophilic synthetic polymers, (1), (2), (3) and (4), are illustrated hereafter in due course.

(1) The hydrophilic synthetic polymers having a nonionic group therein include those having a hydroxyl group, those having an amide group, and those having a nonionic group other than hydroxyl and amide groups.

The hydrophilic synthetic polymers having a hydroxyl group therein include poly(vinyl alcohol); ethylene-vinyl alcohol copolymer; synthetic celluloses such as methyl cellulose, ethyl cellulose, carboxymethyl cellulose, hydroxyethyl cellulose, hydroxypropyl cellulose, hydroxypropylmethyl cellulose, cellulose acetate, cellulose nitrate; hydroxy lower alkyl (meth)acrylate polymers such as polyhydroxyethyl (meth)acrylate and polyhydroxypropyl (meth)acrylate; and polymers of polyethylene glycol (meth)acrylate (e.g. triethylene glycol (meth)acrylate).

The hydrophilic synthetic polymers having an amide group therein include poly(meth)acrylamide; N-alkyl (meth) acrylamide polymers such as poly-N-methyl (meth)acrylamide, and poly-N-hexyl (meth)acrylamide; N,N-dialkyl (meth)acrylamide polymers such as poly-N,N-dimethyl (meth)acrylamide, and poly-N,N-dipropyl (meth)acrylamide; N-hydroxyalkyl (meth)acrylamide polymers such as poly-N-methylol (meth)acrylamide, and poly-N-hydroxy ethyl (meth)acrylamide; and N,N-dihydroxyalkyl (meth)acrylamide polymers such as poly-N,N-dihydroxyethyl (meth)acrylamide; and vinyllactam polymers such as poly-N-vinylpyrrolidone.

The hydrophilic synthetic polymers having a nonionic group other than the hydroxyl and amide groups, include polymers having ether group therein such as polyether polyols, for example, polyethylene oxide, and polypropylene oxide, and poly(vinyl ether)s; polymers having an acid anhydride therein such as polymareic anhydride; polymers having a sulfonyl group such as polyalkylvinyl sulfone, and alkylvinylsulfone-acrylate copolymer; and polyurethanes.

The polymers including a nonionic group as exampli-fied above may be used either alone or in combination of two or more for a hydrophilic synthetic polymer.

(2) The hydrophilic synthetic polymers having an anionic group therein include those having a carboxyl group, those having a sulfonic group, those having an anionic group other than the carboxyl and the sulfonic groups, and salts of said organic acids.

The hydrophilic synthetic polymers having a carboxyl group therein include polymers of an unsaturated carboxylic acid such as poly(meth)acrylic acid, poly-(eth)acrylic acid, polycrotonic acid, polysorbic acid, polymareic acid, polyitaconic acid, polycinnamic acid, polyaconitic acid, polymer of butadiene-1-carboxylic acid; poly-esters having a terminal carboxyl group prepared by reacting a polycarboxylic acid and a polyol; and acidic cellulose derivatives modified by a carboxylic acid.

The hydrophilic synthetic polymers having a sulfonic group therein include polymers of an aliphatic or an aromatic vinylsulfonic acid such as polyvinylsulfonic acid, polyallylsulfonic acid, polyvinyltoluenesulfonic acid, and polystylenesulfonic acid; polymers of a (meth)acrylsulfonic acid such as polysulfoethyl (meth)acrylate, polysulfopropyl (meth)acrylate, and poly-2-acrylamide-2-methylpropanesulfonic acid; acidic cellulose derivatives modified by a sulfonic acid; and poly(vinyl alcohol) derivatives modified by a sulfonic acid.

The hydrophilic synthetic polymers having an anionic group other than the carboxyl and sulfonic group include those having phosphate group such as polymers of a monoester of hydroxyalkyl(meth)acrylate and phosphoric acid, for example, poly-2-hydroxyethylacryloyl phosphate, poly-2-hydroxyethylmethacryloyl phosphate, and polyphenyl-2-acryloyloxyethyl phosphate.

Salts of the above mentioned acids may also be used. Examplary alkaline metal salts such as sodium, potassium, and lithium salts; alkaline earth metal salts such as calcium and magnesium salts; and ammonium salts and amine salts such as alkyl amine salts, for example, methylamine, and trimethylamine salts, and alkanolamine salts, for example, triethanolamine and diethanolamine salts.

The polymers including an anionic group as exemplified above may be used either alone or in combination of two or more for a hydrophilic synthetic polymer.

(3) The hydrophilic synthetic polymers having a cationic group therein include those having a quaternary ammonium group and those having a cationic group other than the quaternary ammonium group.

The hydrophilic synthetic polymers having a quaternary ammonium group therein include polymers of a reactant between a dialkylaminoalkyl(meth)acrylate and an alkyl halide or a dialkyl sulfate such as poly(meth)acryloyl oxyethyltrimethyl ammonium chloride or bromide, poly(meth)acryloyl oxyethyltrimethyl ammonium sulfate, poly(meth)acryloyl oxyethyldimethylethyl ammonium chloride or bromide, poly(meth)acryloyl oxyethyl-diethylmethyl ammonium chloride, poly(meth)acryloyl oxyethyldimethyl benzyl ammonium chloride, poly(meth)acryloyl oxypropyltrimethyl ammonium chloride, and poly(meth)acryloyl oxypropyltrimethyl ammonium sulfate; polymers of a reactant between a dialkylaminohydroxyalkyl (meth)acrylate and an alkyl halide or a dialkyl sulfate such as poly(meth)acryloyl oxyhydroxyethyltrimethyl ammonium chloride or bromide, poly(meth)acryloyl oxyhydroxyethyltrimethyl ammonium sulfate, and poly(meth)acryloyl oxyhydroxypropyltrimethyl ammonium chloride; polymers of a reactant between a dialkylaminoalkyl (meth)acrylamide and an alkyl halide or a dialkyl sulfate such as chloride or bromide of polytrimethylaminoethyl (meth)acrylamide, chloride of polytrimethylaminopropyl (meth)acrylamide, and chloride of polydiethylmethylaminopropyl (meth)acrylamide; polymers of a reactant between a dialkylaminohydroxyalkyl (meth)acrylamide and an alkyl halide or a dialkyl sulfate such as chloride of polytrimethylaminohydroxyethyl (meth)acryl amide, chloride of polytrimethylaminohydroxypropyl (meth)acrylamide, and chloride of polydiethylmethylamino hydroxypropyl (meth)acrylamide; N-alkylvinylpyridinium halides such as poly-N-methyl-2-vinylpyridinium chloride or bromide, and poly-N-methyl-4-vinylpyridinium chloride; and trialkylallyl ammonium halides such as polytrimethylallyl ammonium chloride or bromide, and polytriethylallyl ammonium chloride.

The polymers having a cationic group other than the above mentioned quaternary ammonium group, include those having amino group therein and inorganic acid salts of such polymers having amino group therein.

The polymers including amino group therein include dialkylaminoalkyl (meth)acrylate polymers such as polydimethylaminomethyl (meth)acrylate, polydimethylaminoethyl (meth)acrylate, polydimethylaminopropyl (meth)acrylate, polydiethylaminomethyl (meth)acrylate, polydiethylamino ethyl(meth)acrylate, and polydiethylaminopropyl (meth)acrylate; dialkylaminoalkyl (meth)acrylamide polymers such as polydimethylaminomethyl (meth)acrylamide, polydimethylaminoethyl (meth)acrylamide, polydimethylaminopropyl (meth)acrylamide, polydiethylaminomethyl (meth)acrylamide, polydiethylaminoethyl (meth)acrylamide, and polydiethylaminopropyl (meth)acrylamide; polyethyleneimine; polytrimethyleneimine; polyvinylamine; and polyallylamine. The inorganic acid salts of such polymers having amino group therein include hydrochloric acid, hydrobromic acid, sulfuric acid, and phosphoric acid salts of such polymers.

The polymers including a cationic group as exemplified above may be used either alone or in combination of two or more for a hydrophilic synthetic polymer.

(4) The hydrophilic synthetic polymers having an amphoteric group therein may be any polymers having both anionic and cationic groups therein, for example, copolymers of a cationic vinyl monomer and an anionic vinyl monomer, and polyamino acids.

The hydrophilic synthetic polymers as mentioned above may be crosslinked so long as the hydrophilic properties of the polymer are retained. Exemplary cross-linked hydrophilic polymers include water absorbent polymers and ion exchange resins.

The above-mentioned hydrophilic synthetic polmers of (1) to (4) may be used either alone or in combination of groups two or more irrespective of the group of the hydrophilic synthetic polymers.

Among the above-mentioned hydrophilic synthetic polymers, preferred comprises a structural unit including hydroxyl group, ether group, or the both groups therein, which are included in group (1), the polymers having a nonionic group therein. Particularly, among those polymers, a polymer having at least 30 mol % of the hydroxy group containing structural unit therein is more preferable.

According to a second aspect of the present invention, there is provided a stretched molded article comprising a moisture shrinkable block copolymer of a thermoplastic polymer and a hydrophilic synthetic polymer.

The thermoplastic polymer and the hydrophilic synthetic polymer which may be used for preparing the block copolymer are similar to those used for the graft copolymer of a thermoplastic polymer and a hydrophilic synthetic polymer, which is the first aspect of the present invention.

According to a third aspect of the present invention, there is provided a stretched molded article comprising a moisture shrinkable blend of a thermoplastic polymer and a hydrophilic synthetic polymer.

The thermoplastic polymer and the hydrophilic synthetic polymer which may be used for preparing the blend are similar to those used for the graft copolymer of a thermoplastic polymer and a hydrophilic synthetic polymer, which is the first aspect of the present invention.

According to a fourth aspect of the present invention, there is provided a stretched molded article comprising a moisture shrinkable graft copolymer of a thermoplastic polymer and a polysaccharide selected from the group consisting of a plant gum polysaccharide, a seaweed polysaccharide, a plant mucilage polysaccharide of heteroglycan, an animal polysaccharide, and a microbial polysaccharide.

The thermoplastic polymer which may be used for preparing this graft copolymer is similar to the thermoplastic polymer used for the graft copolymer which is the first aspect of the present invention.

The polysaccharides which may be used for this graft copolymers are selected from the group consisting of; plant gum polysaccharides such as arabic gum, ghatti gum, karaya gum, and tragacanth gum; seaweed polysaccharides such as agar, carrageenan, alginic acid, sodium alginate, and laminaran; plant mucilage polysaccharides of heteroglycan such as pectin, locust bean gum, guar gum, tamarind, galactomannan, and glucomannan; animal polysaccharides such as chitin, chitosan, hyaluronic acid, chondroitin, and chondroitin sulfuric acid; and microbial polysaccharides which are not starch like polysaccharides, such as xanthane gum, pluran, and cardran. Among these, preferred are sodium alginate, xanthan gum, guar gum, locust bean gum, and carrageenan.

According to a fifth and a sixth aspects of the present invention, there are provided a stretched molded article, fifth one is comprising a moisture shrinkable block copolymer of, and sixth one is comprising a moisture shrinkable blend of a thermoplastic polymer and a polysaccharide selected from the group consisting of a plant gum polysaccharide, a seaweed polysaccharide, a plant mucilage polysaccharide of heteroglycan, an animal polysaccharide, and a microbial polysaccharide.

The thermoplastic polymer which may be used for preparing this block copolymer or this blend is similar to the thermoplastic polymer used for the graft copolymer which is the first aspect of the present invention. The polysaccharides which may be used for preparing this block copolymer or this blend is similar to the polysaccharides used for the graft copolymer which is the fourth aspect of the present invention.

Methods for providing a graft copolymer of a thermoplastic polymer and a hydrophilic synthetic polymer or a polysaccharide; a block copolymer of a thermoplastic polymer and a hydrophilic synthetic polymer or a polysaccharide; a blend of a thermoplastic polymer and a hydrophilic synthetic polymer or a polysaccharide are illustrated hereafter in due course.

For purpose of simplification, the expression "hydrophilic polymer (A)" as used hereafter means that the above-mentioned hydrophilic synthetic polymer and polysaccharide selected from the group consisting of a plant gum polysaccharide, a seaweed polysaccharide, a plant mucilage polysaccharide of heteroglycan, an animal polysaccharide, and a microbial polysaccharide.

First, in accordance with the present invention, a means for obtaining a graft copolymer of a thermoplastic polymer and a hydrophilic polymer (A) will be described hereafter.

The weight ratio of the thermoplastic polymer and the hydrophilic polymer (A) is altered depending on the requirements of the conditions, such as the capability of moisture shrinkage; in general, the range of a weight ratio may be in ratios of 90:10 to 10:90, preferably in ratios of 70:30 to 30:70.

The method for preparing a graft copolymer of a thermoplastic polymer and a hydrophilic polymer (A) may include a method prepared by graft copolymerizing a hydrophilic monomer to a thermoplastic polymer; a method prepared by graft copolymerizing a monomer which is resulted in a thermoplastic polymer after polymerization to a hydrophilic polymer (A); a method prepared by adding a hydrophilic group to a graft copolymerized polymer or imparting a thermoplastisity to a graft copolymerized polymer, by leading polymer reaction to a graft coporymerized polymer.

A hydrophilic monomer may be a substance which forms, after the polymerization terminated, a structure described in terms of the hydrophilic polymer (A). There are no other restrictions. Also a monomer which is resulted in a thermoplastic polymer after polymerization may be a substance of which forms a structure described in terms of the thermoplastic polymer after the polymerization terminated. There are no other restrictions.

A graft polymerizing method may applied a method well known in the prior art, for example, a method prepared by initiating graft copolymerization with irradiation of radiation, electron beam, ultraviolet light or the like; a method prepared by leading graft copolymerization with a free radical polymerization catalyst, for example, cerium salt, inorganic peroxides [such as hydrogen peroxide, persulfuric ammonium, persulfuric potassium, persulfuric sodium], organic peroxides [such as benzoyl peroxide, di-t-butyl peroxide, cumen hydroperoxide, succinate per-oxide, di(2-ethoxyethyl) peroxydicarbonate], redox catalysts [provided by a combination of reducing agents such as sulfite or bisulfite of alkaline metal, ammonium sulfite, ammonium bisulfite, ascorbic acid and oxidizers such as peroxodisulfate of alkaline metal, ammonium peroxodisulfate, peroxides], azo compounds [such as azobis isobutyronitrile, azobiscyanovalerate, 2,2'-azobis-(2-amidinopropane) hydrochloride], or with free radical polymerization catalysts examlified above used in combination of two or more.

If a graft copolymer of a thermoplastic polymer and a hydrophilic polymer (A) provided by using either method described above contains an acid group or a base, it could be neutralized if necessary. For example, if a graft copolymer contains an acid group, it can be yield its alkaline metal salt upon adding an alkaline metal compound. The degree of neutralization is not specifically defined and may be altered.

The methods for adding a hydrophilic group or imparting a thermoplasticity to a graft copolymerized polymer by leading polymer reaction to a graft coporimerized polymer, may include, for instance, a method prepared by graft-copolymerizing a carboxyl vinyl ester monomer such as vinyl formate, vinyl acetate, vinyl monochloro acetate, and vinyl butyrate to a thermoplastic polymer followed by hydrolyzing a carboxyl vinyl ester unit of the obtained graft copolymer, then adding a hydroxyl group which is a hydrophilic group to the graft copolymer. These type of hydrolysis group may include a nitrile group and an amide group and so on.

Graft copolymers in the present invention may be the graft copolymers having a hydrophilic polymer (A) as a main chain and a thermoplastic polymer as a side chain, or having a thermoplastic polymer as a main chain and a hydrophilic polymer (A) as a side chain; such as poly(vinyl alcohol)-methyl acrylate graft copolymers, poly(vinyl alcohol)-isopropyl acryrate graft copolymers.

Not all of the thermoplastic polymers and the hydrophilic polymers (A) used in the present invention are required to be graft copolymers, but some of these polymers may be included as homopolymers respectively. In this case the content of these graft copolymers included in the thermoplastic polymers and hydrophilic polymers (A) is usually 20% or higher, preferably 35% or higher.

Subsequently, in accordance with the present invention means of obtaining a block copolymer of a thermoplastic polymer and a hydrophilic polymer (A) are illustrated.

The approximate range of a weight ratio of thermoplastic polymers and hydrophilic polymers (A) herein is usually in a ratio of 90:10 to 10:90, preferably in a ratio of 70:30 to 30:70, though it may be altered depending on the conditions such as the conditions required for capability of moisture shrinkage.

The methods for preparing a block copolymer of a thermoplastic polymer and a hydrophilic polymer (A)

used here may be prepared by the means which are well known in the prior art and instances of the means are examplified below.

A first means includes a method prepared by binding two different polymers, both of which having at least one functional group on terminal end.

More embodying the method, there is a method prepared by allowing a dehydration and condensation reaction to a thermoplastic polymer having at least one terminal hydroxyl or amino group, and hydrophilic polymer (A) having at least one terminal carboxylic group; a method prepared by allowing a dehydration and condensation reaction to a thermoplastic polymer having at least one terminal carboxyl group, and a hydrophilic polymer (A) having at least one terminal hydroxyl or amino group; a method prepared by allowing an addition reaction to a thermoplastic polymer having at least one terminal epoxy group, hydroxyl group or amino group, and a hydrophilic polymer (A) having at least one terminal acid anhydride group; a method prepared by allowing an addition reaction to a thermoplastic polymer having at least one terminal acid anhydride group, and a hydrophilic polymer (A) having at least one terminal epoxy group, hydroxyl group or amino group.

The thermoplastic polymers and the hydrophilic polymers (A) used here respectively having at least one terminal respective group, such as a carboxyl group, a hydroxyl group, and amino group, an acid anhydride group or an epoxy group, may contain the compositions, previously defined in terms of the thermoplastic polymers and the hydrophilic polymers (A), wherein above-mentioned reactive group is bound to at least one end of the polymer compositions, and not particularly limited.

A second means includes a method prepared by binding two different polymers with a certain compound possessing at least two functional groups.

More embodying the method, the method is prepared, by binding a thermoplastic polymer having at least one terminal hydroxyl group, and a hydrophilic polymer (A) having at least one terminal hydroxyl group, by using diisocyanate.

The thermoplastic polymer and the hydrophilic polymer (A) used here respectively having at least one terminal hydroxyl group may contain the compositions, previously defined in terms of the thermoplastic polymers and the hydrophilic polymers (A), having a hydroxyl group is bound to at least one end, and not particularly limited.

A third means for preparing a block copolymer of a thermoplastic polymer and a hydrophilic polymer (A) may include a method prepared by polymerizing a vinyl monomer which is yielded a thermoplastic polymer as a result of the polymerization to a hydrophilic polymer (A) having at least one terminal peroxide group; and a method prepared by polymerizing a hydrophilic vinyl monomer to a thermoplastic polymer having at least one terminal peroxide group.

The thermoplastic polymer and the hydrophilic polymer (A) herein respectively having at least one terminal peroxide group may be substances composed of either the thermoplastic polymer and the hydrophilic polymer (A) previously defined in terms of each and respectively possessing at least one terminal peroxide group. There are no other particular restrictions.

The vinyl monomer which is yielded a thermoplastic polymer as the result of polymerization, may be selected from a vinyl monomer which forms the composition of the thermoplastic polymer previously defined in terms of the thermoplastic polymers, upon the polymerization. There are no other particular restrictions.

The hydrophilic vinyl monomer may be a substance which upon polymerization, forms the composition of the hydrophilic polymer previously defined in terms of the hydrophilic polymers (A). There are no other particular restrictions.

A forth means include a method prepared by polymerization of a vinyl monomer which results in thermoplastic polymer after polymerization to a hydrophilic polymer (A) having at least one terminal azo group; and a method prepared by polymerization of a hydrophilic vinyl monomer to a thermoplastic polymer having at least one terminal azo group.

The thermoplastic polymer and the hydrophilic polymer (A) respectively having at least one terminal azo group may be substances composed of either the thermoplastic polymer and the hydrophilic polymer (A) previously defined in terms of each and respectively possessing at least one terminal azo group. There are no other particular restrictions.

The vinyl monomer which results in a thermoplastic polymer after polymerization and the hydrophilic vinyl monomer may respectively contain the composition which are previously defined in the third means. There are no other particular restrictions.

A fifth means include a method prepared by adding a vinyl monomer which results in thermoplastic polymer after polymerization to a hydrophilic polymer (A) having at least one terminal photo-reactive group, and then initiating to polymerization by irradiating with ultraviolet light and the like; and a method prepared by adding a hydrophilic vinyl monomer to a thermoplastic polymer having at least one terminal photo-reactive group, and then initiating to polymerization by irradiating with ultraviolet light and the like.

Either the thermoplastic polymer or the hydrophilic polymer (A) used here, respectively having at least one terminal photo-reactive group may be substances composed of either the thermoplastic polymer or the hydrophilic polymer (A) previously defined in terms of each and respectively possessing at least one terminal photo-reactive group. There are no other particular restrictions.

Either the vinyl monomer which results in a thermoplastic polymer after polymerization or the hydrophilic vinyl monomer may respectively contain the composition which are previously defined in the third means. There are no other particular restrictions.

A sixth means include a method prepared by adding a vinyl monomer which results in a thermoplastic polymer after polymerization to a hydrophilic polymer (A) having at least one terminal redox-reactive group, and then initiating to polymerization by adding a redox catalyst to thus prepared mixture; and a method prepared by adding a hydrophilic vinyl monomer to a thermoplastic polymer having at least one terminal redox-reactive group, and then initiating to polymerization by adding a redox catalyst to thus prepared mixture.

Either the thermoplastic polymer or the hydrophilic polymer (A) used here, respectively having at least one terminal redox-reactive group may be substances composed of either the thermoplastic polymer or the hydrophilic polymer (A) previously defined in terms of each and respectively possessing at least one terminal redox-reactive group. There are no other particular restrictions.

Either the vinyl monomer which results in a thermoplastic polymer after polymerization or the hydrophilic vinyl monomer may respectively contain the composition which are previously defined in the third means. There are no other particular restrictions.

A seventh means include a method prepared by polymerizing a vinyl monomer which results in a thermoplastic polymer after polymerization to a ozone treated hydrophilic polymer (A); and a method prepared by polymerizing a hydrophilic vinyl monomer to a ozone treated thermoplastic polymer.

Either the vinyl monomer which results in a thermoplastic polymer after polymerization or the hydrophilic vinyl monomer may respectively contain the composition which are previously defined in the third means. There are no other particular restrictions.

A eighth means include a method prepared by a mechanochemical treatments such as mastication, oscillation by oscillating mill, ultrasonic irradiation, high speed agitation and gaseous phase swelling.

More embodying the method, for instance, a method prepared in manner of masticating a thermoplastic polymer and a hydrophilic polymer (A) together, scissioning a polymer mechanically, and then rebinding the scissioned polymers; a method prepared in manner of masticating a hydrophilic polymer (A) under the presence of a vinyl monomer which results in a thermoplastic polymer after polymerization and leading this mixture to advance to a block copolymerizing reaction; and a method prepared in manner of masticating a thermoplastic polymer under the presence of a hydrophilic vinyl monomer and leading this mixture to advance to a block copolymerizating reaction.

Either the vinyl monomer which results in a thermoplastic plastic polymer after polymerization or the hydrophilic vinyl monomer may respectively contain the composition which are previously defined in the third means. There are no other particular restrictions.

A ninth means may apply a method prepared by leading an ionic polymerization reaction involving a living polymer.

More specifically, the method is made by applying such polymerization as an anionic living polymerization, a cationic living polymerization, or a coordinated ionic polymerization.

A tenth means may apply a method prepared by adding thermoplasticity or a hydrophilic group to a block copolymer which is after a block copolymerization by a polymer reaction.

There are, for example, the method of hydrolyzing a block copolymer comprising a hydrolyzable polymer moiety from carboxyl vinylester such as vinyl formate, vinyl acetate, vinyl monochloroacetate or vinyl butyrate and a thermoplastic polymer moiety, resulting in adding a hydrophilic group by replacing a carboxyl ester unit with a hydroxyl group. A nitrile group, an amide group, or others may be used as a hydrolysis group.

If a block copolymer of a thermoplastic polymer and a hydrophilic polymer (A) provided by using either method mentioned above contains an acid group or a base, it could be neutralized if necessary. For example, if a block copolymer contains an acid group, it could be resulted in its alkaline metal salt by adding an alkaline metal compound. The degree of neutralization has no restriction, then it may be altered.

In accordance with the present invention, examples of the block copolymer are poly(vinyl alcohol)-methyl acrylate block copolymer, polyethylene oxide-methyl acrylate block copolymer and the like.

In accordance with the present invention, neither a thermoplastic polymer nor a hydrophilic polymer (A) compose whole compounds as a block copolymer, and these polymers may include in part a homopolymer respectively. In this case, the content of the block copolymer contained in the thermoplastic polymer and the hydrophilic polymer (A) is usually 20% or higher, preferably 35% or higher.

Further, in accordance with the present invention the means of obtaining a blend of a thermoplastic polymer and hydrophilic polymer (A) are illustrated.

In the preparation of the blend, the approximate range of a weight ratio of thermoplastic polymers and hydrophilic polymers (A) is usually in a ratio of 90:10 to 10:90, preferably in a ratio of 70:30 to 30:70, though it may be altered depending on the conditions such as the conditions required for capability of moisture shrinkage.

In the present invention, methods for obtaining a blend of a thermoplastic polymer and a hydrophilic polymer (A) may apply the methods, which are well known in the prior art such as latex blending, solution blending, mechanical and melt blending, and IPNs(Interpenetrating Polymer Networks). These methods mentioned above are described in detail hereafter.

Latex blending may include a method prepared by blending a thermoplastic polymer latex and a hydrophilic polymer (A) latex; a method prepared by putting the solution containing one polymer into water containing a surface active agent, emulsifying, and then blending the other polymer latex into the emulsified solution.

Solution blending may include a method prepared by blending two different polymer solutions which are respectively obtained by solution polymerization; a method prepared by dissolving a thermoplastic polymer and a hydrophilic polymer (A) in a common solvent; a method prepared by dissolving a thermoplastic polymer and a hydrophilic polymer (A) in different respective solvents prior to blending; a method prepared by polymerizing one monomer in a solution of the other polymer; a method prepared by leading solution copolymerization; and the like.

Mechanical and melt blending methods may include a method prepared by kneading a thermoplastic polymer and a hydrophilic polymer (A), while the both polymers are in a plasticating or molten state; a method prepared by impregnating or swelling a solution of one polymer to the other polymer and kneading the obtained composition; a method prepared by kneading a mixture comprising one polymer and the other polymer solution one or both of whom is impregnated into a porous filler; a method prepared by kneading a master batch having a facilitated composition for blending, which is prepared prior to blending, and a deficient material of the master batch.

IPN(Interpenetrating polymer networks) method may include: The LIPNs method made by mixing and reacting two different latexes of a thermoplastic polymer and a hydrophilic polymer (A) with a cross-linking agent; The SINs method made by simultaneously polymerizing one substance, which may be either a prepolymer or a monomer which results in a thermoplastic polymer after polymerization, and a second substance, which may be either a hydrophilic prepolymer or a monomer which results in a hydrophilic polymer (A) after polymerization. without copolymerization them; The SIPN method made by swelling one polymer which is cross-linked with a monomer which results in the other polymer after polymerization, and then polymerizing the monomer; or at first, by blending both monomers which result in a thermoplastic polymer and a hydrophilic polymer (A) each after polymerization, at second step, polymerizing one of the both monomer at first, and finally, polymerizing the rest monomer, herein polymerization is submitted two steps; The FIPNs method made by penetrating a monomer which results in either a thermoplastic polymer or a hydrophilic polymer (A) to voids of the other polymer which is formed porous material or swelled with a solvent, and then allowing to polymerize further.

A method prepared by imparting thermoplasticity or adding a hydrophilic group to blended polymers by leading a polymer reaction, may include a method by hydrolyzing blended polymers comprising a thermoplastic polymer and a polymer of carboxyl vinylester such as vinyl formate, vinyl acetate, vinyl monochloroacetate or vinyl butyrate and a thermoplastic polymer, and then adding a hydrophilic group by replacing a carboxyl ester unit with a hydroxyl group. A nitrile group, an amide group, or others may be used as a hydrolysis group.

Furthermore, in each method as mentioned above compatibility among polymers could be increased by using modifiers such as compatibilizing agents, surface active agents, emulsifying agents or plasticizers mixed into the blend.

If the obtained polymer contains an acid group or a base, it could be neutralized if necessary. A polymer which contains an acid group, for example, could yield its alkaline metal salt by adding an alkaline metal compound into the polymer solution. The degree of this neutralization is not specifically defined and could be altered.

In accordance with the present invention, examples of the blends of a thermoplastic polymer and a hydrophilic polymer (A) may include a blend of poly(vinyl alcohol) and poly(methyl acrylate), and the like.

Next, methods for processing a stretched molded article from a moisture shrinkable resin of the present invention comprising a moisture shrinkable polymer which is prepared in such a manner as the above mentioned procedure will be illustrated.

Forms of the article in the present invention are not strictly defined, and the molded articles can be formed in an optional form such as a film, a sheet, a tape, a mesh, a foam, a fiber, and a rod. The most useful article is the form of film at present.

The methods for producing the article molded in the present invention may include a method whereby a film formed article can be carried out either by such methods for stretch molding as stretched extrusion, blown film extrusion, or calendering. There is also a method for stretch molding to apply a unstretched film made by casting.

In accordance with the method of blown film extrusion, the biaxial oriented film molded from the moisture shrinkable resins in the present invention may be molded by following procedure; a unstretched, unoriented sheet can be obtained by heating the moisture shrinkable resin provided in the present invention, kneading, extruding into a tubular shape by using an extruder, and then cooling. The operating conditions of the extruder such as the temperature for kneading, the rotational speed of the extruder screw, and the thickness of the tubular sheets vary considerably depending upon the compositions of the moisture shrinkable resin and upon the required properties of the film. There are no other restrictions. When kneading, plasticizers such as water, alcohol, urea, or the like can be added to the moisture shrinkable resins, if necessary. The plasticizer loadings are not specifically defined.

Then, the unstretched tubular sheet, which is obtained in a previous step, is introduced into a tubular stretching equipment and biaxially orientate the sheet by blown stretching at a optimal temperature for effective orientation. The degree of stretching in the biaxial directions may be not equal. The biaxial oriented film is taken out from the tubular stretching equipment and, if necessary, the film is dried to depress natural shrinkage.

In place of the above mentioned procedure, it is applicable to proceed directly to orientate a film by blown stretching an unoriented tubular sheet extruded from a tubular extruding die.

In accordance with the method for stretch molding to apply a unstretched film made by casting, for example, procedure of obtaining a unstretched film may be carried out by dissolving the moisture shrinkable resin in a solvent; spreading and drying the resin solution on a plane plate; and then stripping a film which is formed on the plate from the plate to obtain an unstretched film. Either a type of solvents, resin concentration of dissolved solution, or thickness of the film vary considerably depending upon the composition of the resin and upon the required properties of the producting film. There are no other restrictions. If necessary, plasticizers such as alcohol can be added to the solvent when dissolving the resin into the solvent. The plasticizer loadings are not specifically defined.

Next step in the procedure may be prepared by heating the obtained unstretched film up to a optimal temperature for stretching, stretching the film biaxially, and then cooling the film. When stretching the film, if it is required to use alcohol or water as a plasticizer, either the plasticizer can be blended with the resin during the step of obtaining the unstretched film in such a manner, or the obtained unstretched film can be soaked in a plasticizer solution such as water or alcohol, or can be exposed in a plasticizer vapor such as water or alcohol.

The obtained biaxtial oriented film can be dry, if necessary, to depress natural shrinkage of the film.

When a molded article from the moisture shrinkable resin of the present invention, is in use as in the form of a film, the film can be laminated with other films by using such methods as extrusion laminate method, dry lamination method or the like.

One of the extrusion laminate method proceeds by the following procedure, an unstretched multilayer sheet is coextruded from plural coextruders equipped with a multimanifold die, and then the obtained unstretched multilayer sheets are stretched by using a multi-circular die.

The dry lamination method proceeds, for instance, by the following procedure, spreading a adhesive dissolved in a organic solvent, such as polyurethane resin adhesive, on a stretched moisture shrinkable film of this invention, removing the organic solvent by evaporation, and laminating the obtained film with other film by heating or contact-bonding.

Further more, another methods for obtaining multilayer films may include a method prepared by spreading a solvent which contains components of other films on the film of this invention, and then drying; and the like.

For obtaining a fiber formed article such as filament, staple, from a moisture shrinkable resin of the present invention by spinning and drawing, several well known processes including a process of dry spinning, a process of wet spinning and the like can be selected to produce the fiber.

The following types of extenders or additives may be mixed with the stretched molded articles from moisture shrinkable resins of this invention to be in use: plasticizers, fillers, foaming agents, mold release agents, lubricants, antiblocking agents, surface active agents, decomposable additives, antistatic agents, pigments, dyes, coloring agents, perfumes, organic substances (such as pulp powders, polysaccharides), inorganic substances (such as silica, zeolite, active carbon, far infrated rays irradiating ceramics), freshness preserving agents, water absorbent polymers, drying agent, antiblooming agents, deodorizers, aromatizers, oxygen scavengers, ethylene adsorbents, medicine-efficacy components, fungicides, antimildew agents, thermal stabilizers, antioxidants, ultraviolet light absorbers, and others. These extenders or additives mentioned above may be added in various steps in processing, such as during a step of producing a moisture shrinkable resin; during a step of molding a moisture shrinkable resin; during a step of after molding a moisture shrinkable article by painting with a extender or a additive on the surface of the article, or by soaking the article in a extender or a additive; or the like.

The moisture which is used for the shrinkage of the articles of the present invention is not strictly defined, and the moisture is selected from liquid phase and gas phase, such as water, steam, moist air and the like. Moist air is preferable.

As described above, the stretched molded article from the moisture shrinkable resin in accordance with the present invention, when molded into a film and used for shrink-packing purposes, experiences significantly smaller decrease in tensile strength during shrinkage by absorbing moisture compared to the conventional moisture shrinkable films containing starch therein. The risk of tearing or rupturing during the shrink-wrapping operation, therefore, is markedly minimized. The thus shrunk article also experiences little decrease in its tensile strength even after prolonged storage, and therefore, packages wrapped with the film of the present invention are prevented from unintentional rupturing during their storage. The article of the present invention, of course, does not require any heating for their shrinkage, but shrink in a highly humid atmosphere at room temperature. Therefore, the article of the present invention may be used for wrapping films especially for wrapping heat-irresistible articles, moisture detectors, agricultural and medical materials, gathered portions of diapers, and the like.

The present invention is further illustrated by the following examples which are not intended to be limiting. All parts in the examples herein are by weight unless otherwise indicated.

In the Examples, shrinkage and tensile strength were evaluated as described below. Also, film wrapping test was carried out as described below.

1. Shrinkage at various relative humidities (a) Examples 1 to 7 and Comparative Examples 1 to 2 at relative humidities of 70, 85, and 95%:

Test pieces cut out from the obtained films in Examples were measured for their lenghth in machine direction (MD) before and after leaving the films at room temperature at relative humidities of 70, 85 and 95% for 24 hours and calculated its ratio to determine the shrinkage.

(b) Examples 1 to 7 and Comparative Examples 1 to 2 at relative humidities of 60 and 90%:

Test pieces cut out from the obtained films in Examples were measured for their length in both machine direction (MD) and transverse direction (TD) before and after leaving the films at room temperature at relative humidities of 60 and 90% for 24 hours and calculated its ratios to determine the shrinkage of each directions.

2. Tensile strength

Test pieces cut out from the obtained films in Examples were evaluated for their original tensile strength before their shrinkage in machine direction (MD) by Instron tester at a drawing speed of 50 mm/minute. The test pieces were left at room temperature at relative humidity of 90% for 24 hours, and the this obtained shrunk films were evaluated for their shrunk tensile strength under the same evaluating conditions as above. The test pieces which had been shrunk as described above were stored for one month and the film were also evaluated for their tensile strength under the same evaluating conditions as above.

3. Film wrapping test

Test pieces were cut out from each of the obtained films in Examples to a dimension of 40 cm×20 cm. Each test pieces was then rolled into a cylinder of 12 cm in diameter and 20 cm in height and the overlapping areas were bonded to each other. Into the cylinder were inserted four cylindrical bottles in perpendicular direction to the longitudinal axis of the cylindrically rolled films. The this prepared packages were left at room temperature at relative humidity of 90% to bring the film into close contact with the bottles. The packages were then observed the presence of tear. Next, the packages which had no tear were stored for one month, and again observed the presence of tear.

EXAMPLE 1

150 parts of poly(vinyl alcohol) were dissolved in 3,200 parts of water and temperature of the solution was adjusted to 50° C. under nitrogen atmosphere. 150 parts of methyl acrylate were added to the solution, and thereafter, 10 parts of cerium ammonium nitrate and 50 parts of 1N nitric acid were added to the solution to initiate the polymerization of the reactants. The reaction mixture was agitated in nitrogen stream at 50° to 55° C. for 5 hours. The obtained product was neutralized with sodium hydroxide, and then precipitated by adding excess methanol. The precipitate was filtered and dried, and grinded into particles having particle size of less than 40 mesh. The finely grinded particles was a graft copolymer of poly(vinyl alcohol) which was a hydrophilic synthetic polymer and poly(methyl acrylate) which was a thermoplastic polymer.

The thus obtained finely grinded particles was melt-extruded from an extruder equipped with a ring die, and the extrudate was stretched by blown molding to form a film having a thickness of 60 micrometers, which was the stretched molded article from the moisture shrinkable resin of the present invention.

The obtained film was evaluated for the various properties as described above. The results are shown in Table 1 and Table 2.

EXAMPLE 2

The finely grinded particles prepared in Example 1 was extruded from a double-layer T-die extruder and stretched to form a film having a thickness of 65 micrometers, which was the stretched molded article from the moisture shrinkable resin of the present invention.

The obtained film was evaluated for various properties as described above. The results are shown in Table 1 and Table 2.

EXAMPLE 3

150 parts of methyl acrylate were dissolved in 3,200 parts of water, and temperature of the solution was adjusted to 15° C. under the nitrogen atmosphere. To the solution were added 15 parts of 1% aqueous solution of hydrogen peroxide and 10 parts of 1% aqueous solution of ferrous sulfate for the initiation of polymerization. After 6 hours from the initiation of polymerization, polymer precipitate produced was filtered. The precipitate was dried and 140 parts of poly(methyl acrylate) having terminal hydroxyl group was obtained.

120 parts of the thus obtained poly(methyl acrylate) having terminal hydroxyl group were binded with 50 parts of polyethylene oxide by 4 parts of tolylene diisocyanate. There was obtained a block copolymer comprising blocks of poly(methyl acrylate) which was a thermoplastic polymer, and blocks of polyethylene oxide which was a hydrophilic synthetic polymer. The block copolymer composition also included homopolymers of both the thermoplastic polymers and hydrophilic synthetic polymers therein.

The block copolymer composition was melt extruded from an extruder equipped with a ring die, and the extrudate was stretched by blown molding to form a film having a thickness of 50 micrometers, which was the stretched molded article from the moisture shrinkable resin of the present invention.

The obtained film was evaluated for various properties as described above. The results are shown in Table 1 and Table 2.

EXAMPLE 4

75 parts of poly(vinyl alcohol) were dispersed in 500 parts of water. The dispersion was heated to dissolve the poly(vinyl alcohol) followed by cooling to room temperature. The prepared poly(vinyl alcohol) solution was mixed with 600 parts of aqueous emulsion containing 150 parts of poly(methyl acrylate) under the presence of an anionic emulsifying agent, and the mixture was dried. There was obtained a blend of poly(vinyl alcohol) which was a hydrophilic synthetic polymer, and poly(methyl acrylate) which was a thermoplastic polymer.

The obtained blend was melt-extruded from an extruder equipped with a ring die, and the extrudate was stretched by blown molding to form a film having a thickness of 50 micrometers, which was article molded from the moisture shrinkable resin of the present invention.

The obtained film was evaluated for various properties as described above. The results are shown in Table 1 and Table 2.

EXAMPLE 5

The blend of poly(vinyl alcohol) and poly(methyl acrylate) prepared in Example 4 was extruded from a double-layer T-die extruder and stretched to form a film having a thickness of 50 micrometers, which was the stretched molded article from the moisture shrinkable resin of the present invention.

The obtained film was evaluated for various properties as described above. The results are shown in Table 1 and Table 2.

EXAMPLE 6

150 parts of sodium alginate were added to 3,200 parts of water, and the mixture was agitated at room temperature under the nitrogen atmosphere to dissolve the sodium alginate in the water. To the solution were added 300 parts of methyl acrylate, 3 parts of cerium ammonium nitrate, and 50 parts of 6N nitric acid. The reaction mixture was agitated at 40° to 45° C. for 5 hours to polymerize the reactants. The obtained product was then filtered, washed with methanol, dried, and finely grinded to produce finely grinded particles of the desired graft copolymer.

A small amount of water were added to the obtained graft copolymer as a plasticizer, and the mixture was agitated to form a uniform mixture. The uniform mixture was introduced into a hopper, and melt-extruded from a kneading extruder equipped with a ring die at a resin temperature of 80° to 100° C. The ring die was maintained at 100° C. The extrudate extruded from the ring die was stretched by blown molding at stretch ratio of MD:3.6 and TD:4.0. The obtained film, which was the article molded from the moisture shrinkable resin of this invention, has a thickness of 65 micrometers.

The obtained film was evaluated for various properties as described above. The results are shown in Table 1 and Table 2.

EXAMPLE 7

150 parts of sodium alginate were added to 3,200 parts of water, and the mixture was agitated at room temperature under nitrogen atmosphere to dissolve the sodium alginate in the water. To the solution were added 250 parts of methyl acrylate, 3 parts of ammonium persulfate, and 1.5 parts of sodium bisulfite. The reaction mixture was agitated at 40° to 45° C. for 3 hours to polymerize the reactants. The resulting product was added to excess volume of methanol for precipitation. The precipitate was dried and grinded to produce particles of a blend of sodium alginate and poly(methyl acrylate).

A small amount of water were added to the obtained blend as a plasticizer and the mixture was agitated to form a uniform mixture. The uniform mixture was introduced into a hopper, and melt-extruded from a kneading extruder equipped with a ring die at a resin temperature of 80° to 120° C. The ring die was maintained at 120° C. The extrudate extruded the ring die was stretched by blown molding at stretch ratio of MD:3.2 and TD:3.6. The obtained film, which was the article molded from the moisture shrinkable resin of this invention, had a thickness of 70 micrometers.

The obtained film was evaluated for various properties as described above. The results are shown in Table 1 and Table 2.

COMPARATIVE EXAMPLE 1

150 parts of cationic starch were dispersed in 3,000 parts of water, and the dispersion was heated to a temperature of 95° C. under nitrogen atmosphere with agitation. The dispersion was kept at 95° C. for 30 minutes, and then cooled to 40° C. To the dispersion were added 225 parts of methyl acrylate, 5 parts of cerium ammonium nitrate, and 45 parts of 1N nitric acid. The reaction mixture was agitated at 40° to 45° C. for 3 hours to polymerize the reactants. The obtained product was then neutralized with aqueous solution of sodium hydroxide to pH 7, and added in a excess volume of methanol for precipitation. The precipitate was dried and grinded to produce particles of a starch based graft copolymer.

A small amount of water and urea were added to the obtained graft copolymer as a plasticizer, and mixture was agitated to form a uniform mixture. The uniform mixture was introduced into a hopper, and melt-extruded from a kneading extruder equipped with a ring die at a resin temperature of 70° to 90° C. The ring die was maintained at 95° C. The extrudate extruded from the ring die was stretched by blown molding at stretch ratio of MD:4.0 and TD:4.2. The obtained film, which was a stretched molded starch base article molded from the moisture shrinkable resin, had a thickness of 55 micrometers.

The obtained film was evaluated for various properties as described above. The results are shown in Table 1 and Table 2.

COMPARATIVE EXAMPLE 2

A commercially available polyethylene-based heat shrinkable film (Ohkuwrap PE shrink, manufactured by Ohkura Industrial K.K., Japan) was evaluated for various properties as described above. The results are shown in Table 1 and Table 2.

TABLE 1

| Item Conditions Relative humidity % | Shrinkage at various relative humidities | | | | | | |
|---|---|---|---|---|---|---|---|
| | 60 | | 70 | 85 | 90 | | 95 |
| Direction | MD | TD | MD | MD | MD | TD | MD |
| Example 1 | 1 | 2 | 2 | 40 | 45 | 43 | 50 |
| Example 2 | 1 | 2 | 3 | 40 | 44 | 46 | 50 |
| Example 3 | 2 | 1 | 1 | 45 | 48 | 47 | 55 |
| Example 4 | 0 | 1 | 2 | 34 | 37 | 39 | 43 |
| Example 5 | 2 | 0 | 2 | 36 | 37 | 38 | 41 |
| Example 6 | 1 | 2 | 2 | 30 | 36 | 31 | 37 |
| Example 7 | 0 | 1 | 2 | 30 | 32 | 32 | 33 |
| Comparative Example 1 | 2 | 1 | 3 | 31 | 35 | 41 | 44 |
| Comparative Example 2 | 0 | 0 | 0 | 0 | 0 | 0 | 0 |

TABLE 2

| | Tensile strength and film wrapping test | | | | |
|---|---|---|---|---|---|
| | Tensile strength, kg/mm² | | | Wrapping test* | |
| | Immediately | | 1 month | Immediately | 1 month |
| Item Test time | Before shrink | after shrink | after shrink | after shrink | after shrink |
| Example 1 | 2.5 | 2.2 | 2.0 | 20 | 20 |
| Example 2 | 2.5 | 2.1 | 1.9 | 20 | 20 |
| Example 3 | 2.4 | 2.1 | 1.9 | 20 | 20 |
| Example 4 | 2.3 | 2.0 | 1.8 | 18 | 18 |
| Example 5 | 2.5 | 2.1 | 1.8 | 18 | 18 |
| Example 6 | 2.5 | 2.0 | 1.7 | 17 | 16 |
| Example 7 | 2.4 | 1.6 | 1.3 | 16 | 14 |
| Comparative Example 1 | 3.2 | 0.7 | 0.2 | 6 | 2 |
| Comparative Example 2 | 1.7 | — | — | — | — |

*20 test pieces were cut out from each type of the film produced, and 20 packages were prepared therefrom. Number of packages which exhibited no tear was counted.

What is claimed is:

1. A stretched molded articles comprising a moisture shrinkable polymer selected from the group consisting of
   (A) a graft copolymer of a thermoplastic polymer having a glass transition temperature of up to 50° C. and a hydrophilic synthetic polymer selected form the group consisting of (1) a nonionic polymer having a functional group selected from the group consisting of a hydroxy group, an amide group, an alkylene oxide group, and ether group, and lactam group, (2) an anionic polymer having a functional selected from the group consisting of a carboxylic group, a sulfonic acid group, a phosphoric acid group and their salts, (3) a cationic group having a functional group selected from the group consisting of a quaternary ammonium group and an acid salt of amino group and (4) an amphoteric polymer having both functional group (anionic and cationic) selected from the functional group described in (2) and (3);
   (B) a block copolymer of a thermoplastic polymer having a glass transition temperature of up to 50° C. and a hydrophilic synthetic polymer;
   (C) a blend of a thermoplastic polymer having a glass transition temperature of up to 50° C. and a hydrophilic synthetic polymer;
   (D) a graft copolymer of a thermoplastic polymer having a glass transition temperature of up to 50° C. and a polysaccharide selected from the group consisting of a plant gum polysaccharide, a seaweed polysaccharide, a plant mucilage polysaccharide of heteroglycan, an animal polysaccharide, and a microbial polysaccharide;
   (E) a block copolymer of a thermoplastic polymer having a glass transition temperature of up to 50° C. and a polysaccharide selected from the group consisting of a plant gum polysaccharide, a seaweed polysaccharide, a plant mucilage polysaccharide of heteroglycan, an animal polysaccharide, and a microbial polysaccharide;
   (F) a blend of a thermoplastic polymer having a glass transition temperature of up to 50° C. and a polysaccharide selected from the group consisting of a plant gum polysaccharide, a seaweed polysaccharide, a plant mucilage polysaccharide of heteroglycan, an animal polysaccharide, and a microbial polysaccharide.

2. The stretched molded article according to claim 1 which is capable of shrinking at a temperature of up to 50° C. and a relative humidity of at least of at least 75%.

3. The stretched molded article according to claim 1 wherein the thermoplastic polymer and the hydrophilic synthetic polymer or the polysaccharide are used at a weight ratio in the range of from 90:10 to 10:90.

4. The stretched molded article according to claim 1 wherein the thermoplastic polymer and the hydrophilic synthetic polymer or the polysaccharide are used at a weight ratio in the range of from 70:30 to 30:70.

5. The stretched molded article according to claim 1 wherein the hydrophilic synthetic polymer having a functional group selected from the group consisting of a hydroxy group, an ether group, an alkylene oxide group, a carboxylic acid group and the salts thereof.

6. The stretched molded article according to claim 1 wherein the hydrophilic synthetic polymer is a synthetic polymer having at least 30 mol % of the hydroxy group containing structural unit based on the mole of the total structural unit.

7. The stretched molded article according to claim 1 wherein the thermoplastic polymer is an elastomer having a glass transition temperature of up to 35° C.

8. The stretched molded article according to claim 1 wherein the article is stretched at 2 to 10 times of the original length.

9. The stretched molded article according to claim 1, 2, 4, 5, 6, or 7 wherein the article is a film.

* * * * *